(12) United States Patent
Halverson et al.

(10) Patent No.: US 11,852,179 B2
(45) Date of Patent: Dec. 26, 2023

(54) QUICK RELEASE MOUNTING SYSTEM

(71) Applicant: DQD Mounting Systems, LLC, Kuna, ID (US)

(72) Inventors: Tate Halverson, Nampa, ID (US); Clifford Turner, Nampa, ID (US)

(73) Assignee: DQD Mounting Systems, LLC, Kuna, ID (US)

( * ) Notice: Subject to any disclaimer, the term of this patent is extended or adjusted under 35 U.S.C. 154(b) by 230 days.

(21) Appl. No.: 17/523,733

(22) Filed: Nov. 10, 2021

(65) Prior Publication Data
US 2023/0145076 A1    May 11, 2023

(51) Int. Cl.
| F41A 35/00 | (2006.01) |
| F16B 2/16 | (2006.01) |
| F41A 23/18 | (2006.01) |
| F41A 23/52 | (2006.01) |
| F41A 23/26 | (2006.01) |

(52) U.S. Cl.
CPC ............. *F16B 2/16* (2013.01); *F41A 23/18* (2013.01); *F41A 23/26* (2013.01); *F41A 23/52* (2013.01)

(58) Field of Classification Search
CPC ........ F41A 23/005; F41A 35/00; F41A 11/00; F41G 1/387; F41G 1/141; F41G 11/001; F41C 27/00; F16M 13/02; F16M 11/04; F16M 11/041; G03B 17/561
See application file for complete search history.

(56) References Cited

U.S. PATENT DOCUMENTS

| 2,343,050 A | 2/1944 | Fischer |
| 2,670,228 A | 2/1954 | Pagliuso |
| 3,085,462 A | 4/1963 | Myers |
| 4,929,973 A | 5/1990 | Nakatani |
| 4,967,640 A | 11/1990 | Dodd |
| 5,337,100 A | 8/1994 | Oxford |

(Continued)

FOREIGN PATENT DOCUMENTS

| CA | 2281754 C | 11/2008 |
| EP | 1160499 A1 | 12/2001 |
| WO | 2011023511 A1 | 3/2011 |

*Primary Examiner* — J. Woodrow Eldred
(74) *Attorney, Agent, or Firm* — Scott Swanson; Shaver & Swanson, LLP (57) ABSTRACT

A quick release mounting system that utilizes two opposing plate assemblies configured for attachment. The two opposing plate assemblies are configured for attachment by a pair of spaced apart posts positioned in a male plate assembly connecting to a female plate assembly. The pair of spaced apart posts has an actuator mechanism positioned within the posts, and a series of ball bearing around a circumference of the posts. In a preferred embodiment the actuation mechanism is configured to bias the ball bearing out from the circumference of each of the posts, with the actuation mechanism configured to release the outer bias on the ball bearings. Alternatively, the actuation mechanism can be configured such that the actuation mechanism biases the ball bearings out when the mechanism is actuated by a user. The actuation mechanism can utilize a mechanical actuator, such as a rotary or linear actuator, or an electro-mechanical actuator, which utilizes a mechanical actuator that is actuated by an electrical device, such as a solenoid.

19 Claims, 7 Drawing Sheets

(56) References Cited

U.S. PATENT DOCUMENTS

| | | | |
|---|---|---|---|
| 5,601,380 A * | 2/1997 | Guthrie | F16D 3/387 |
| | | | 403/328 |
| 6,637,904 B2 | 10/2003 | Hernandez | |
| 7,077,582 B2 | 7/2006 | Johnson | |
| 8,104,213 B2 | 1/2012 | Keng | |
| 8,398,315 B2 | 3/2013 | Johnson | |
| 8,628,258 B2 | 1/2014 | Vogt | |
| 9,328,998 B2 | 5/2016 | Volfson | |
| 10,161,706 B2 | 12/2018 | Roberts | |
| 10,310,249 B1 | 6/2019 | Bentley | |
| 10,557,582 B1 * | 2/2020 | Khaitov | F16K 7/20 |
| 2003/0218108 A1 | 11/2003 | Werner | |
| 2008/0247746 A1 | 10/2008 | Law | |
| 2010/0218670 A1 | 9/2010 | Keng | |
| 2011/0126444 A1 | 6/2011 | Keng | |
| 2017/0232620 A1 * | 8/2017 | Kalb | B25J 15/0416 |
| | | | 279/2.09 |
| 2017/0368633 A1 * | 12/2017 | Scotchmer | B23K 9/282 |
| 2020/0050086 A1 | 2/2020 | Thomson | |

\* cited by examiner

QUICK RELEASE MOUNTING SYSTEM

TECHNICAL FIELD

The herein disclosed and claimed inventive concepts generally relate to a quick release mounting system.

BACKGROUND

Quick release mechanisms are utilized in a variety of industries. For example, quick release mechanisms are often used to attach cameras to tri-pods, spotting scopes to tri-pods, and a variety of other components to racks and other support mechanisms. What is needed is an improved quick release mechanism that provides for a secure connection between two components. What is additionally needed is a quick release system that allows for connection to a lower receiver of a modular firearm.

SUMMARY OF THE DISCLOSURE

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

What is disclosed is a quick connect mounting system. The quick connect mounting system has a male plate assembly and a female plate assembly. The male plate assembly having at least two posts positioned in a spaced apart arrangement. The posts extend away from the male plate assembly. Each of the posts comprises a series of retractable ball bearings positioned in an outer circumference of each of the posts. The retractable ball bearings are configured to be extended in a locked position and retracted in an unlocked position in a preferred embodiment. The male plate assembly has an actuator configured to simultaneously move the ball bearings of each post between the locked and unlocked positions. Preferably four ball bearings are used in each post.

A female plate assembly is configured for mating engagement with the posts of the male plate assembly. The female plate assembly comprises two sockets for matingly engaging the two posts. The sockets comprise a channel formed in an inner circumference of the sockets. Each channel is configured to engage the ball bearings of its respective post to retain the ball bearings in the channel to prevent separation of the male plate assembly and the female plate assembly when the male actuator is in a locked position.

The ball bearings can be configured to be biased to the locked position when the actuator is released or alternatively to be biased to the unlocked position when the actuator is released. The actuator can be a rotary actuator, a linear actuator, an electro-mechanical actuator, or any other actuator that functions adequately. In a preferred embodiment the actuator utilizes a locking plate having a first ramp and a first ramp ball bearing and a second ramp and a second ramp ball bearing. The locking plate is configured to move in a plane perpendicular to the two posts. The ramps are configured such that depressing the locking plate forces the first and second ramp ball bearings to move upward in the ramps to depress a plunger positioned at a base of each of the ramps to release outward tension on the ball bearings of the posts.

The female plate can be integral with a variety of objects, such as with a lower receiver of a firearm.

The male plate assembly and female plate assembly can be configured with an anti-rotation mechanism. For example, the male plate can be configured with an anti-rotation collar. The female plate assembly is configured for mating engagement with the anti-rotation collar of the male plate assembly such that the anti-rotation collar is configured to prevent the male plate assembly and the female plate assembly from rotating relative to one another.

The male plate assembly in one embodiment has a lower male housing plate and an upper male housing plate. The actuation plate is positioned between the upper male housing plate and the lower male housing plate and configured to slide or rotate between the plates. The actuation plate can be configured with a tab for facilitating depression or rotation of the actuation plate. Each of the male plate assembly and the female plate assembly comprise an extended flange configured for facilitating mounting to an additive manufactured substrate.

DETAILED DESCRIPTION OF THE FIGURES

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

Figure 1:
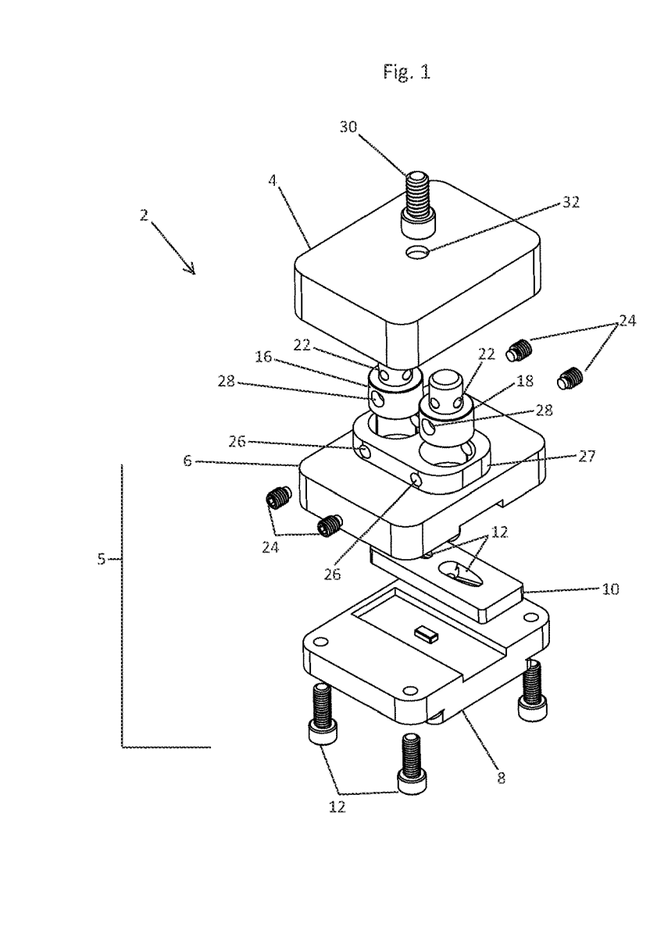
FIG. 1 illustrates an exploded perspective view of a quick release mounting system having a female plate assembly and a male plate assembly.
Figure 1A:
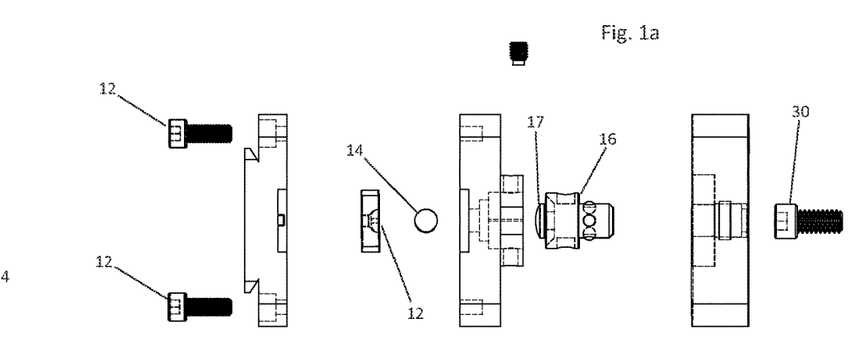
FIG. 1a illustrates a first side exploded isometric view of a quick release mounting system having a female plate assembly and a male plate assembly.
Figure 1B:
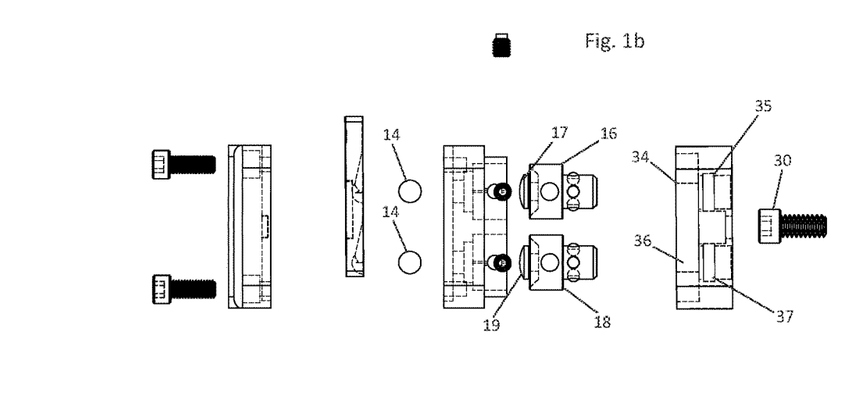
FIG. 1b illustrates a first side exploded isometric view of a quick release mounting system having a female plate assembly and a male plate assembly.

FIG. 1 illustrates an exploded view of a preferred embodiment of a quick connect mechanism. The embodiments disclosed here utilize a dual-post quick connect mechanism. FIG. 1 illustrates a female plate 4 that is configured for attachment to a device such as a camera, rack, or firearm stock. The female plate has a through-hole 32. The through-hole is configured for a bolt 30 to pass through to connect the female plate to an object, such as a camera, spotting scope, telescope, binoculars, or other object. The male plate assembly is configured for mounting or integral with a substrate on which the object is to be mounted. Substrates include, but are not limited to, tripods, bipods, racks, rails, walls, frames, and any substrate to which a user may want to allow for a quick release of an object. FIG. 1a illustrates a side exploded view showing the internal layout of the female plate. FIG. 1b illustrates a second side exploded view with external and internal components of the embodiment illustrated. The female portion has two receptacles 34, 36 (shown e.g. in FIGS. 1b and 3).

Figure 5:
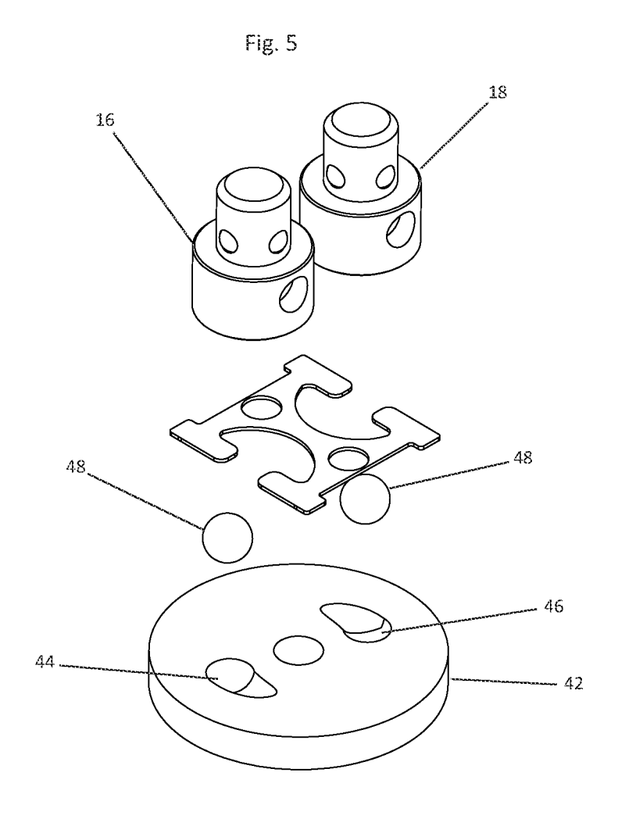
FIG. 5 illustrates an embodiment of an actuation mechanism for actuating the quick release mechanism utilizing a rotary actuator.
Figure 5A:
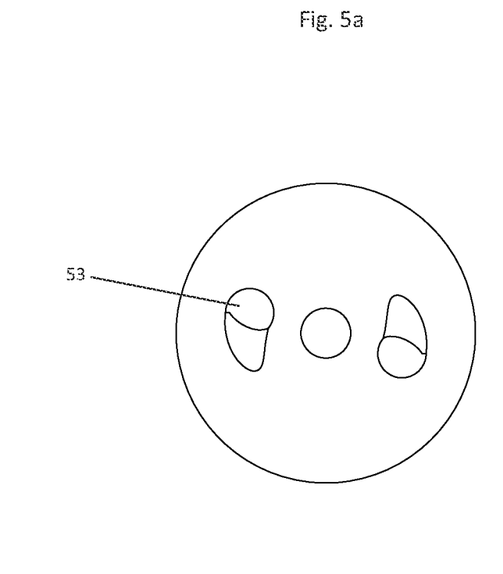
FIG. 5a illustrates an embodiment of an actuation mechanism for actuating the quick release mechanism utilizing a rotary actuator.
Figure 6:
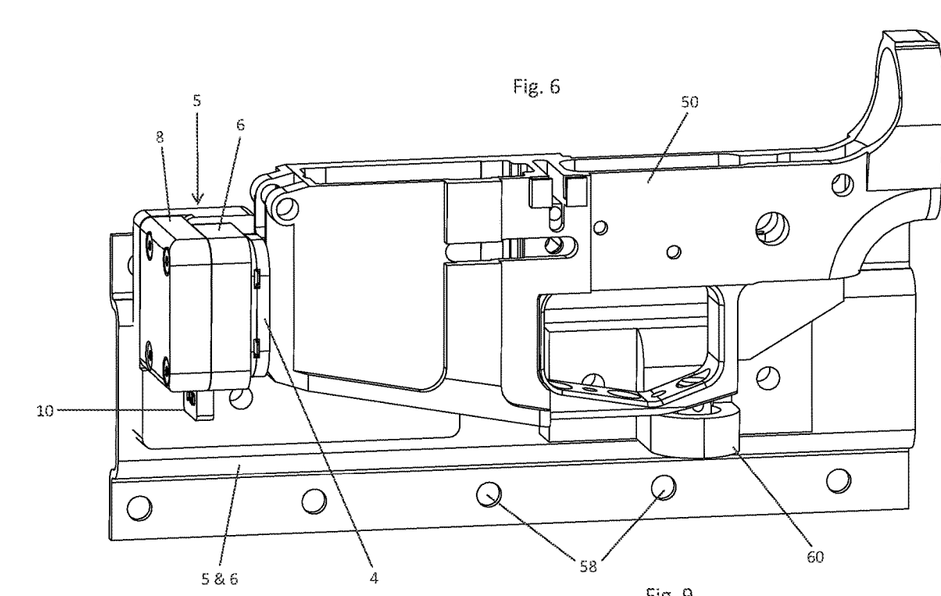
FIG. 6 illustrates a side perspective view of a quick release mounting system mounted to a lower unit of a modular firearm and attached to a rack.
Figure 7:
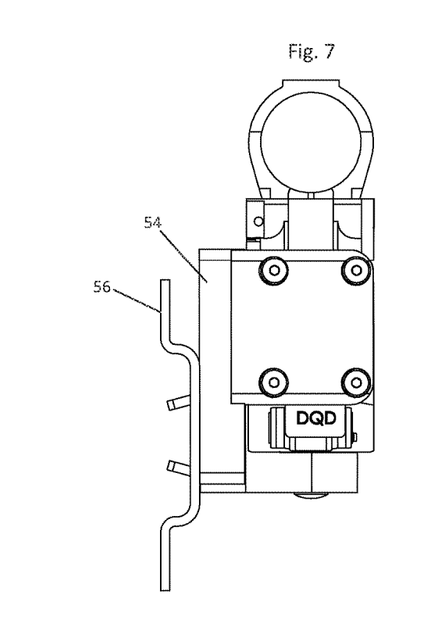
FIG. 7 illustrates a front isometric view of the mount, rack, and lower unit of a modular firearm of FIG. 6.
Figure 8:
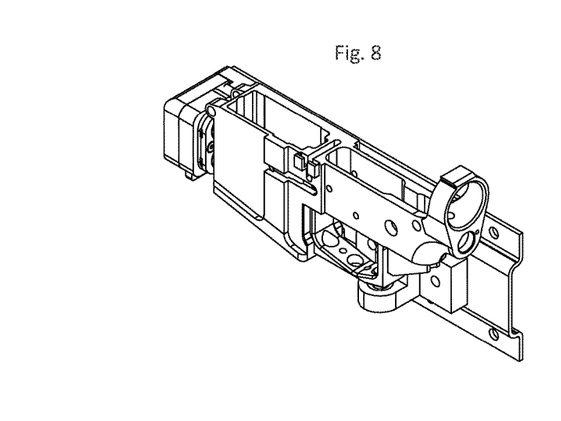
FIG. 8 illustrates a top perspective view of the mount, rack, and lower unit of a modular firearm of FIGS. 6 and 7.
Figure 9:
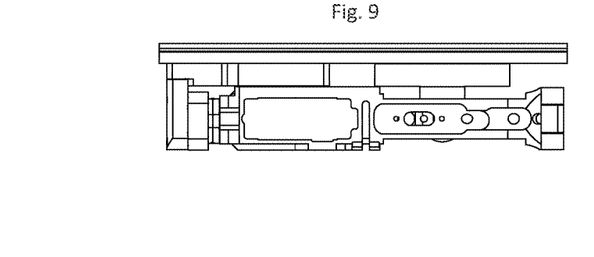
FIG. 9 illustrates a top isometric view of the mount, rack, and lower unit of a modular firearm of FIGS. 6-8.

The device has a male component 5 that has two posts 16, 18 that extend outward from an upper male housing plate 6. The posts comprise a plurality of ball bearings 22 that are configured to extend beyond a circumference of the post when the posts are in a locked position. The ball bearings are configured for placement in internal rings within the female portion 34, 36. Internal rings 35, 37 serve to retain the posts within the female openings in a locked position. To release the ball bearings, user depresses or actuates a release. The release removes outward pressure on the ball bearings of the post. The release is configured to be a dual actuating release in which both of the posts are configured to release with the actuation of a single mechanism. The mechanism can be a linear actuation such as shown in FIG. 1 or alternatively a rotary actuation as shown in FIGS. 5 and 5a, or alternatively an electronic actuation (not shown in figures). The plate 6 is configured with a mounting collar 7 into which the posts 16, 18 are positioned. The mounting collar has openings 26 for placement of set screws 24 that screw into threaded openings 28 of the posts. The posts each have a plunger mechanism 17 configured to release outward locking pressure on the ball bearings. A spring and rod are positioned such that ball bearing depression of the plunger compresses the spring and causes the rod to move within a channel of the post. The rod has a depression and a ramp such that in the locked position, the ramp has forced the ball bearings outward into the locking position, whereas in the released position the rod has moved such that a depression in the rod is aligned with the ball bearings, allowing the ball bearings to move circumferentially inward. The spring serves to bias the rod typically into the locked position, although the configuration can be reversed. An example arrangement is shown in U.S. Pat. No. 3,085,462.

Figure 2:
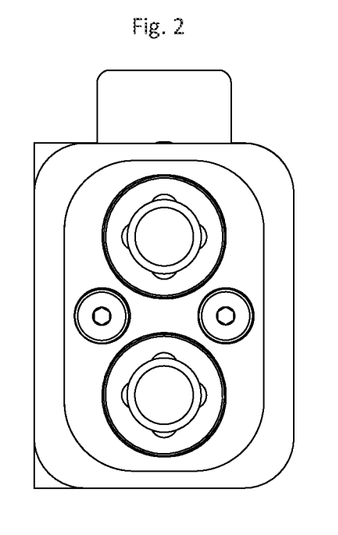
FIG. 2 illustrates a top isometric view of a male plate assembly.
Figure 2A:
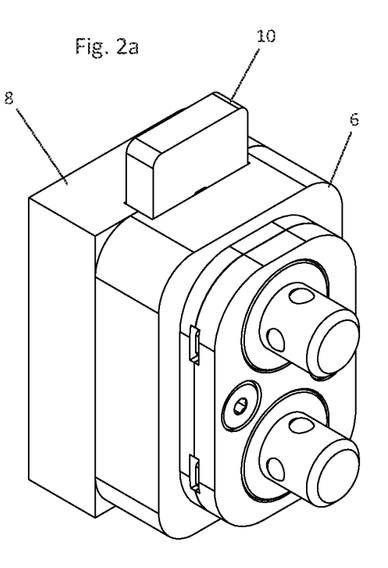
FIG. 2a illustrates a first perspective view of a male plate assembly.
Figure 2B:
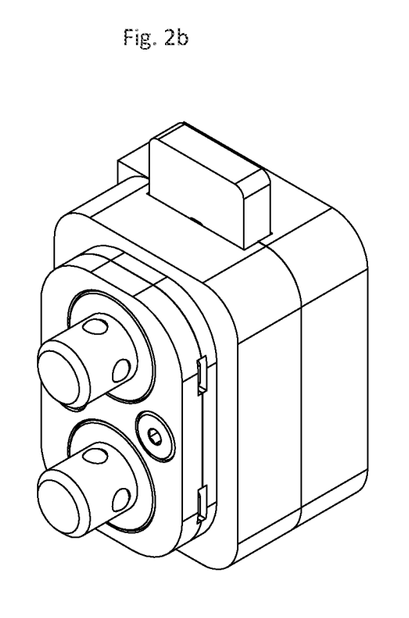
FIG. 2b illustrates a second perspective view of a male plate assembly.
Figure 2C:
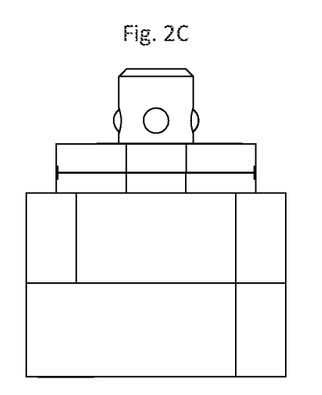
FIG. 2c illustrates a side isometric view of a male plate assembly.

Pressure is typically released from the ball bearings when the plunger mechanism is depressed. The actuating mechanism of FIG. 1 utilizes a linear actuating plate 10. The linear actuating plate 10 has ramps 12 that are configured for the rolling engagement of one ball bearing 14 per ramp. In the locked position, the actuation plate 10 is biased outward as shown in FIGS. 2, 2a, and 2b. The ball bearings in the locked position reside in the deepest part of the ramp 12. Depression of the plate 10 causes the plate to shift inward, forcing the ball bearings up the ramp and simultaneously depressing each plunger for each post. A lower male housing plate 8 forms an opposing side of the housing of the lever actuator from the upper plate 6. The upper plate and lower plate are connected by bolts 12.

Each of the male and female plates and plate assemblies preferably utilize a single tapped hole between the quick disconnects to allow for engagement of the male and female plate assemblies within an object. Typical use of a threaded bolt or screw, such as one utilizing a thumb bolt end that allows for use of users hands to loosen and tighten the bolt.

Alternatively, a rotary actuation device can be utilized that allows for release of the dual posts simultaneously. An embodiment of a rotary actuation device is shown in FIGS. 5 and 5a.

Figure 3:
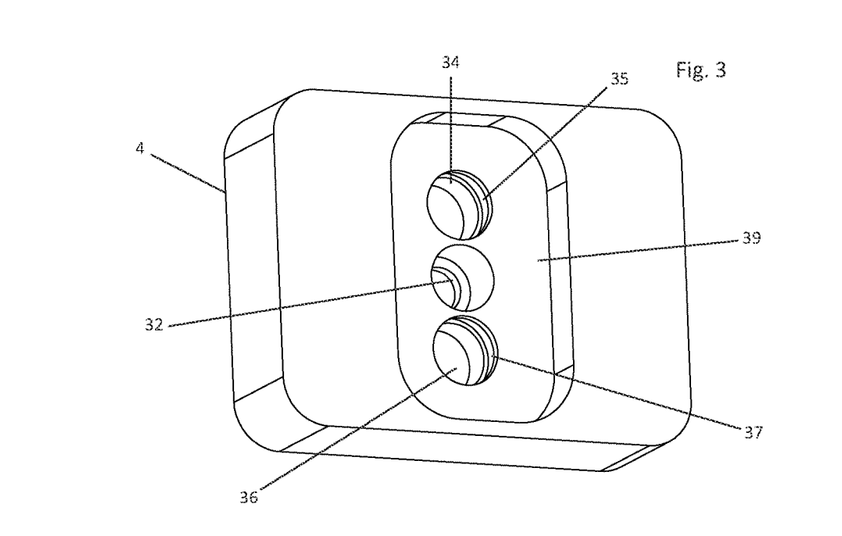
FIG. 3 illustrates a top perspective view of a female plate assembly.
Figure 3A:
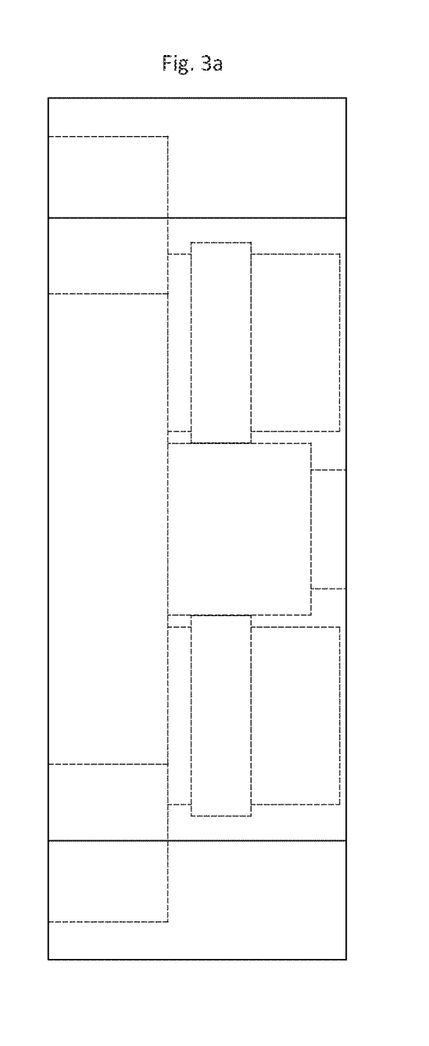
FIG. 3a illustrates a first side isometric view of the internal structure shown in broken lines of a female plate assembly.
Figure 3B:
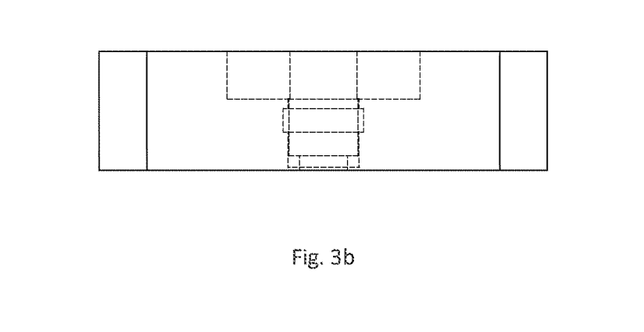
FIG. 3b illustrates a second side isometric view of the internal structure shown in broken lines of a female plate assembly.

FIGS. 2, 2a, 2b, and 2c illustrate views of the assembled male component. The lever plate extends from a side of the assembled male plate. The lever plate 10 is positioned between upper lever housing 6 and lower lever housing 8. FIG. 2a illustrates four ball bearings extending from the outer circumference of each post. Depression of lever 10 inward releases outward pressure from the plunger on the ball bearings. FIGS. 3, 3a, and 3b illustrate the female plate. The female plate has two female receptacles 34, 36 for receiving the male posts of the male plate assembly. The inner rings 35, 37 in the wall of the receptacle are illustrated. The female plate is configured with a depression 39 configured for receiving the mounting collar of the male plate assembly.

Figure 4:
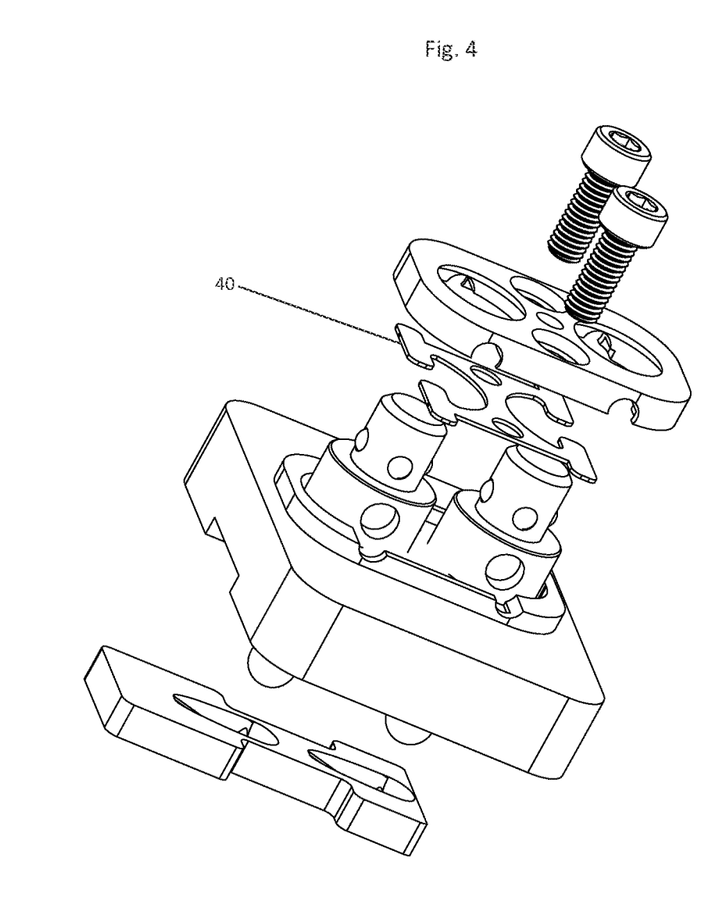
FIG. 4 illustrates an exploded perspective view of an embodiment of a male plate assembly with the lower plate removed to illustrate the actuation mechanism.
Figure 4A:
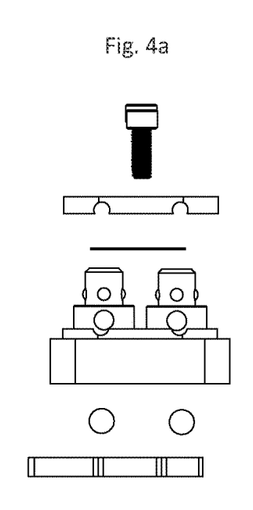
FIG. 4a illustrates a partially exploded isometric partial view of an embodiment of a male plate assembly with the lower plate removed to illustrate the actuation mechanism.
Figure 4B:
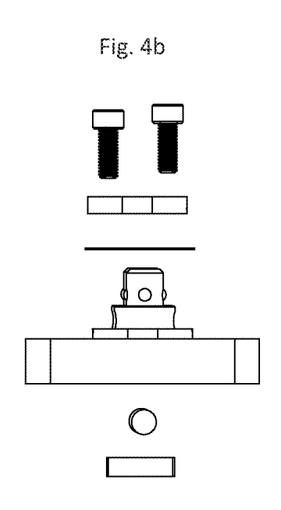
FIG. 4b illustrates a partially exploded isometric partial view of an embodiment of a male plate assembly with the lower plate removed to illustrate the actuation mechanism.

FIG. 4 illustrates a further preferred embodiment of a linear actuation device utilizing a retention spring.

FIG. 5 illustrates a rotary actuation device. The rotary actuation device utilizes curved ramps to allow for actuation of the pair of curved ramps 44, 46 in an actuation plate 42. The actuation plate will utilize a lever or knob to allow for rotation of the actuation plate. Rotation of the actuation plate 42 causes ball bearings 48 to shift upwards in the ramps, depressing the plungers down within the posts 16, 18. Shown in FIG. 5a, the lowest part of the ball ramps 51, 53 provide for a cup in which the ball bearings rest when the quick release device is in the locked or resting position.

A quick release utilizing the dual prongs allows for the quick release to be mounted on a variety of devices. The use of the dual prongs prevents rotation of the devices when attached to the quick release. For example, FIGS. 6-9 illustrate the quick release attached to the lower receiver of a modular firearm, such as a modular AR-15. While only the lower unit is shown, for illustration purposes, the barrel, action and remaining components can be similarly attached with the quick release mounting system utilized to mount a full firearm, or other device, to a rack as shown. Alternatively any other substrate can be utilized as a mounting substrate, with the rack of FIGS. 6-9 shown for illustration purposes. The depicted rack has a support tab or hook 60 for supporting the firearm, although alternate mechanisms can be used, including but not limited to a second quick release mounting system such as the embodiments of quick release mounting systems disclosed herein. Utilizing the quick release attached to the lower receiver of a firearm allows for the firearm to be positioned on, for example, a shooting support, or other firearm retainer. Alternatively, the quick release could be positioned on the side of a firearm to allow for quick and easy attachment to a mounting bracket. Preferably the two quick disconnects are provided with 20 mm spacing. The two posts can be provided in a row comprising a plurality of posts. Alternatively the posts can be arranged in a rectangular or square configuration.

In further detail, FIGS. 6-9 illustrate the assembly positioned on the lower receiver 50 of an AR-15. The male component is attached to a mounting plate 54 that is mounted on a rail 56. The illustrated rail provides for mounting holes 58 for positioning connectors, such as bolts or screws, to mount the rack. For example, the rack can be mounted on a wall, a vehicle, or otherwise for carrying or storing the modular firearm. Alternatively, the female or male plate can be built embedded into an object, such as the depicted AR15. The lower can be formed integrally in the 3D printing or otherwise manufacturing of the object. Electronic actuation would preferably utilize a solenoid to disengage the outer-biased ball bearings of the male post.

Figure 10:
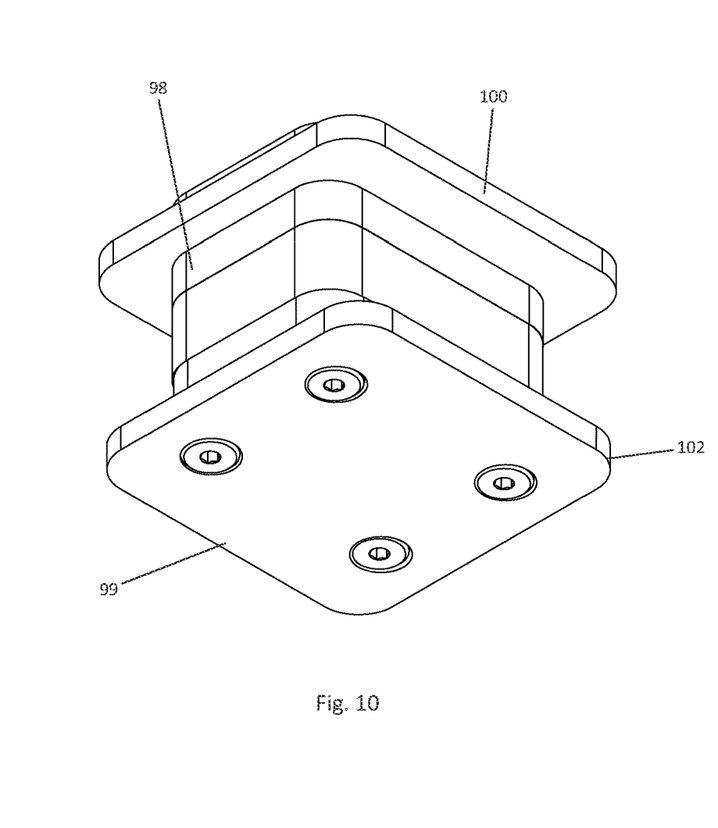
FIG. 10 illustrates a perspective view of a quick release mount having a male plate assembly and a female plate assembly and incorporating flanges for improved mounting of the quick release system on additive manufactured devices.
Figure 10A:
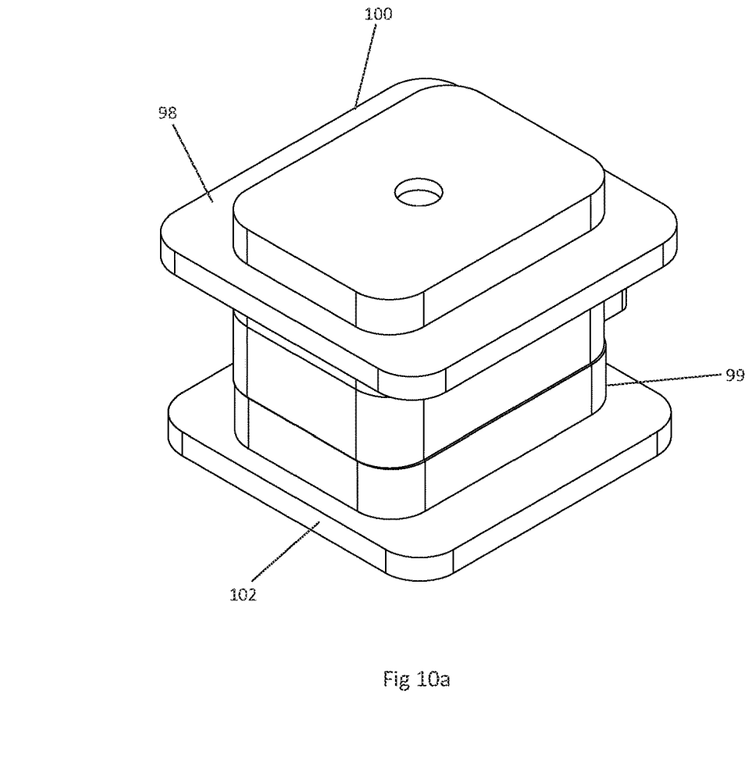
FIG. 10a illustrates a perspective view of a quick release mount having a male plate assembly and a female plate assembly and incorporating flanges for improved mounting of the quick release system on additive manufactured devices.

FIGS. 10 and 10a illustrate a modification of a male plate assembly 99 and female plate assembly 98 with an extended flange forming a lip 100, 102 extending from each plate assembly. The lip on the female and male plate assemblies provides for a greater surface area that enhances the surface area in contact with attachment components fabricated using additive manufacturing, such as 3D printing.

Still other features and advantages of the presently disclosed and claimed inventive concept(s) will become readily apparent to those skilled in this art from the following detailed description describing preferred embodiments of the inventive concept(s), simply by way of illustration of the embodiments contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

What is claimed is:

1. A quick connect mount system comprising:
    a male plate assembly, said male plate assembly comprising two posts positioned in a spaced apart arrangement, wherein said two posts extend away from said plate, wherein each of said posts comprises a series of retractable ball bearings positioned in an outer circumference of each of said posts, wherein said retractable ball bearings are configured to be extended in a locked position and retracted in an unlocked position, said male plate assembly comprising an actuator configured to simultaneously move said ball bearings of each post between said locked and unlocked positions;
    a female plate assembly, wherein said female plate assembly comprises two sockets for matingly engaging said two posts, wherein said sockets comprise a channel formed in an inner circumference of said sockets, wherein said channel is configured to engage said ball bearings of said posts to retain said ball bearings in said channel to prevent separation of said male plate assembly and said female plate assembly when said male actuator is in a locked position.

2. The quick connect system of claim 1, wherein said ball bearings are configured to be biased to said locked position when said actuator is released.

3. The quick connect system of claim 1, wherein said actuator comprises a locking plate comprising a first ramp and a first ramp ball bearing and a second ramp and a second ramp ball bearing, wherein said locking plate is configured to move in a plane perpendicular to said two posts, wherein said ramps are configured such that depressing said locking plate forces said first and second ramp ball bearings to move upward in said ramps to depress a plunger positioned at a base of each of said ramps to release outward tension on said ball bearings of said posts.

4. The quick connect system of claim 3, wherein said locking plate and ramps are configured for linear movement.

5. The quick connect system of claim 3, wherein said locking plate and ramps are configured for rotary movement.

6. The quick connect system of claim 5, wherein said ramps are curved.

7. The quick connect system of claim 1, wherein at least one of said female plate assembly and said male plate assembly comprises a screw hole configured for receiving a screw for connecting said plate assembly to an object.

8. The quick connect system of claim 1, wherein said female plate is integral with a lower receiver of a firearm.

9. The quick connect system of claim 1, wherein said male plate assembly comprises an anti-rotation collar, wherein said posts are mounted in said anti-rotation collar, wherein said female plate assembly is configured for mating engagement with said anti-rotation collar of said male plate assembly such that said anti-rotation collar is configured to prevent said male plate assembly and said female plate assembly from rotating relative to one another.

10. The quick connect system of claim 3, wherein said male plate assembly comprises a lower male housing plate and an upper male housing plate, wherein said actuation plate is positioned between said upper male housing plate and said lower male housing plate, wherein said posts extend from said upper male housing plate.

11. The quick connect system of claim 1, wherein each of said series of circumferential ball bearings comprises four ball bearings.

12. The quick connect system of claim 1, wherein each of said male plate assembly and said female plate assembly comprise an extended flange configured for facilitating mounting to an additive manufactured substrate.

13. The quick connect system of claim 3, wherein said locking plate comprises a tab section that extends outward from said male plate assembly and is configured for depression by a user.

14. The quick connect system of claim 1, wherein said quick connect system is configured with an anti-rotation feature configured to prevent rotation of said male plate assembly relative to said female plate assembly when said male plate assembly and said female plate assembly are matingly engaged.

15. The quick connect system of claim 14, wherein said male plate assembly comprises an anti-rotation collar, wherein said female plate assembly comprises a recess configured to retain said anti rotation collar.

16. The quick connect system of claim 1, wherein said male plate assembly is configured to mount to a rack.

17. The quick connect system of claim 1, wherein said male plate assembly is integral to a rack.

18. The quick connect system of claim 10, wherein said upper male housing plate and said lower male housing plate are connected by a series of screws.

19. The quick connect male housing plate of claim 1, wherein said female plate assembly comprises a through hole configured for placement therethrough of a screw for connecting said female plate assembly to an object.

\* \* \* \* \*